(12) United States Patent
Carr et al.

(10) Patent No.: US 10,592,524 B2
(45) Date of Patent: Mar. 17, 2020

(54) SYSTEMS AND METHODS FOR SHARING CONTEXT AMONG STANDALONE APPLICATIONS

(71) Applicant: HYLAND SWITZERLAND SARL, Geneva (CH)

(72) Inventors: Brian Christopher Carr, Shawnee, KS (US); Cynthia Diane Anschutz, Overland Park, KS (US); Shane Evan Blazek, Shawnee, KS (US); Kristopher John Andrew Haney, Olathe, KS (US); Donald Emmett Lampert, Roeland Park, KS (US); Dylan Christopher Smith, Overland Park, KS (US)

(73) Assignee: HYLAND SWITZERLAND SÀRL, Geneva (CH)

( * ) Notice: Subject to any disclaimer, the term of this patent is extended or adjusted under 35 U.S.C. 154(b) by 624 days.

(21) Appl. No.: 15/133,058

(22) Filed: Apr. 19, 2016

(65) Prior Publication Data
US 2017/0302725 A1    Oct. 19, 2017

(51) Int. Cl.
*G06F 16/25*    (2019.01)
(52) U.S. Cl.
CPC .................. *G06F 16/256* (2019.01)
(58) Field of Classification Search
CPC ................................ G06F 17/30566
USPC ......................................... 709/203
See application file for complete search history.

(56) References Cited

U.S. PATENT DOCUMENTS

| | | | | |
|---|---|---|---|---|
| 6,519,571 B1* | 2/2003 | Guheen | .................. | G06Q 30/02 705/14.66 |
| 9,292,482 B1* | 3/2016 | Thiesen | .................. | G06F 16/93 |
| 2002/0147880 A1* | 10/2002 | Wang Baldonado | ...................... | G06F 17/30864 711/1 |
| 2004/0093323 A1* | 5/2004 | Bluhm | .............. | G06F 17/30011 |
| 2008/0028366 A1* | 1/2008 | Weng | ........................ | G06F 8/20 717/106 |
| 2009/0049053 A1* | 2/2009 | Barker | ..................... | G06F 16/93 |
| 2009/0248476 A1* | 10/2009 | Trinh | ................... | G06Q 10/107 705/7.19 |
| 2011/0053672 A1* | 3/2011 | Gagner | .................... | G07F 17/32 463/16 |
| 2011/0055912 A1* | 3/2011 | Fusari | ............... | G06F 17/30893 726/8 |
| 2012/0179707 A1* | 7/2012 | Hobbs | ..................... | G06F 9/445 707/769 |
| 2012/0330924 A1* | 12/2012 | Rajan | ............... | G06F 16/24542 707/714 |

(Continued)

*Primary Examiner* — Moustafa M Meky
*Assistant Examiner* — Elizabeth Kassa
(74) *Attorney, Agent, or Firm* — Medley, Behrens & Lewis, LLC (57) ABSTRACT

A system and methods for sharing data among multiple standalone applications include: receiving, by a framework executing on a computing device, at least one keyword based upon a user input on a display of one of a plurality of standalone applications loaded via the framework; and storing the at least one in a context object, wherein the context object is accessible by each of the plurality of standalone applications for sharing the at least one keyword. One or more operations may be further performed based on the shared context object and results including content related or matching with the context object may be gathered from multiple standalone applications loaded in the framework.

20 Claims, 6 Drawing Sheets

(56) References Cited

U.S. PATENT DOCUMENTS

| | | | | |
|---|---|---|---|---|
| 2013/0117376 A1* | 5/2013 | Filman | ................ | G06F 17/2288 709/205 |
| 2013/0325891 A1* | 12/2013 | Masood | ................ | G06Q 10/10 707/769 |
| 2014/0101117 A1* | 4/2014 | Uzzaman | .............. | G06F 16/122 707/694 |
| 2014/0281870 A1* | 9/2014 | Vogel | .................... | G06F 17/246 715/220 |
| 2015/0142850 A1* | 5/2015 | Hakusui | ............ | G06F 17/30867 707/777 |
| 2015/0370769 A1* | 12/2015 | Pereira Filho | .......... | G06F 16/93 726/28 |
| 2016/0132608 A1* | 5/2016 | Rathod | ............... | G06F 16/9535 707/722 |
| 2016/0134583 A1* | 5/2016 | Kumar | ................... | H04L 51/36 709/206 |
| 2017/0076046 A1* | 3/2017 | Barnes | ................. | G06F 19/321 |

* cited by examiner

Framework Browser

../homepage/invoiceapprovalapp

Invoice Approval Application ∨ 210a

Pending / Approved / Rejected

Vendor Four
INVOICE NUMBER: 10456
INVOICE DATE: Mar. 27, 2015
452.00 USD
Apr. 27, 2015
USER 1
30D 14H 8M 30S

Vendor Three
INVOICE NUMBER: 54745
INVOICE DATE: Mar. 24, 2015
350.00 USD
Apr. 25, 2015
USER 2
32D 14H 8M 30S

Vendor Four — 400
INVOICE NUMBER: 21032
INVOICE DATE: Mar. 14, 2015
158.17 USD
May 14, 2015
USER 2
42D 14H 8M 30S Rejected | Approve

| Line no. | Description | GL Account | GL Description | Cost Center | Profit Center | WBS Element | Part No. | Quantity | Unit Price | Line Amount | Line Tax | Line Total |
|---|---|---|---|---|---|---|---|---|---|---|---|---|
| 1 | | 1843000 | Finished Goods | | | | CX141800-2 | 3 | 16.00 | 48.00 | 2.00 | 50.00 |
| 2 | Project Unicorn on-site | 6421040 | Project Expenses-Labor | | | 3000-X-1234-0100 | | | | 50.00 | 10.00 | 60.00 |
| 3 | Project Unicorn on-site | 6421045 | Project Expenses-Travel | | | 7000-A-4151-6200 | | | | 40.00 | 0.00 | 40.00 |
| 4 | | 5071010 | CoGS - Retooling | USC1240 | 10001 | | | 1 | 8.00 | 8.00 | 0.00 | 8.00 |
| | | | | | | | | | Sub Total | | | 158.00 |
| | | | | | | | | | Other Tax | | | 0.17 |
| | | | | | | | | | Invoice Total | | | 158.17 |

Invoice Details — 400

Line No.: 1
GL Account: 1843000
GL Description: Finished Goods
Part No.: CX141800-2
Quantity: 3
Unit Price: 16.00
Line Amount: 48.00
Line Tax: 2.00
Line Total: 50.00

Line No.: 2
Description: Project Unicorn on-site
GL Account: 6421040
GL Description: Project Expenses - Labor
WBS Element: 3000-X-1234-0100
Line Amount: 50.00
Line Tax: 10.00
Line Total: 60.00

Line No.: 3
Description: Project Unicorn on-site
GL Account: 6421045
GL Description: Project Expenses - Labor
WBS Element: 7000-A-4151-6200
Line Amount: 40.00
Line Tax: 0.00
Line Total: 40.00

SYSTEMS AND METHODS FOR SHARING CONTEXT AMONG STANDALONE APPLICATIONS

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to data sharing among multiple standalone applications, and more particularly, to performing operations on the multiple standalone applications based on a common set of data without specific know-how of each application's storage mechanisms.

2. Description of the Related Art

A user may want to access related or complementary data stored in multiple sources (e.g., databases), and access to such data may be through applications having access to the desired data. Typically, access to the desired data is being limited to certain portions thereof.

For example, higher education systems utilize multiple applications with corresponding databases to store or house student data. A student's application for admission may be stored in an admission database and accessed through an admission application or module, and a student's financial aid information may be stored in a financial aid database and accessed through a financial aid application or module. In the course of evaluating a student for admission to a particular educational system, admissions' personnel may want to access a particular student's application for admission, essay responses, financial records and social media contributions.

In the healthcare industry, medical information may be stored in separate databases, depending upon the type of service and/or where the services are performed. For example, a patient's medical records may be stored within a doctor's office medical database, his/her medical imaging records may be stored within a hospital's radiology record database, and his/her laboratory records may be stored within a medical laboratory database. In the course of diagnosing a patient, a medical provider, such as a doctor, may need access to the various test reports and records from different databases to get a complete picture of the patient's health and medical history.

In the above and other industries, some current systems would perform separate searches on each of the appropriate databases. For example, in higher education systems, separate searches may be performed in the admissions database, financial aid database, and each social media site of interest for content relevant to a particular student or applicant. In medical systems, a physician may perform separate searches in a radiological database, laboratory database and medical records database for files associated with a particular patient name or identification number.

In other current systems, the databases are programmatically tied together such that the precise storage location of desired information relating to a particular input is known automatically. In such cases, only sources that are programmatically tied together will contribute search results or other outputs, thereby resulting in current systems needing programs which allow communications between unrelated databases.

Accordingly, there is a need for a system for automatically searching modules and applications for relevant and desired data and information without having to programmatically identify the specific sources or precise locations of the data storage, or to perform separate searches on each of the desired sources.

SUMMARY

A system and methods for sharing data among multiple standalone applications are disclosed.

In one example embodiment, a method for sharing data among multiple standalone applications includes receiving, by a framework executing on a computing device, at least one keyword based upon a user input on a display of one of a plurality of standalone applications loaded via the framework; and storing the at least one keyword and the identifier in a context object, wherein the context object is accessible by each of the plurality of standalone applications for sharing the at least one keyword.

In a second example embodiment, a method for gathering related content from multiple standalone applications based on a shared set of data includes receiving, by a framework executing on a computing device, at least one keyword based upon a user input on a display of one of a plurality of standalone applications loaded via the framework; and storing the at least one keyword in a context object. The method further includes broadcasting an event to the other of the plurality of standalone applications, the event indicative of a status of the context object; and receiving a result of an operation performed by at least one of the other of the plurality of standalone applications, the result including one or more assets associated with the other of the plurality of standalone applications and related to the at least one keyword.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the descriptions below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the function specified in the block or blocks.

Accordingly, the blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for sharing a common set of data among multiple standalone applications bound in a single framework in the form of a context object maintained in the framework.

As will be used herein, the term "context object" refers to a storage feature associated with a framework of the present application for storing a common set of data for sharing among multiple standalone applications. The common set of data may be based on a user-selected content from one of multiple standalone applications loaded in the framework. A context object includes a set of values (i.e., a set of keywords) based on an asset associated with one standalone application in the framework. An event indicating the context object is communicated to the other standalone applications in the framework. The other standalone applications in the framework may perform operations based on the received event. How the use of a context object solves the abovementioned problems will be discussed in greater detail below.

Figure 1:
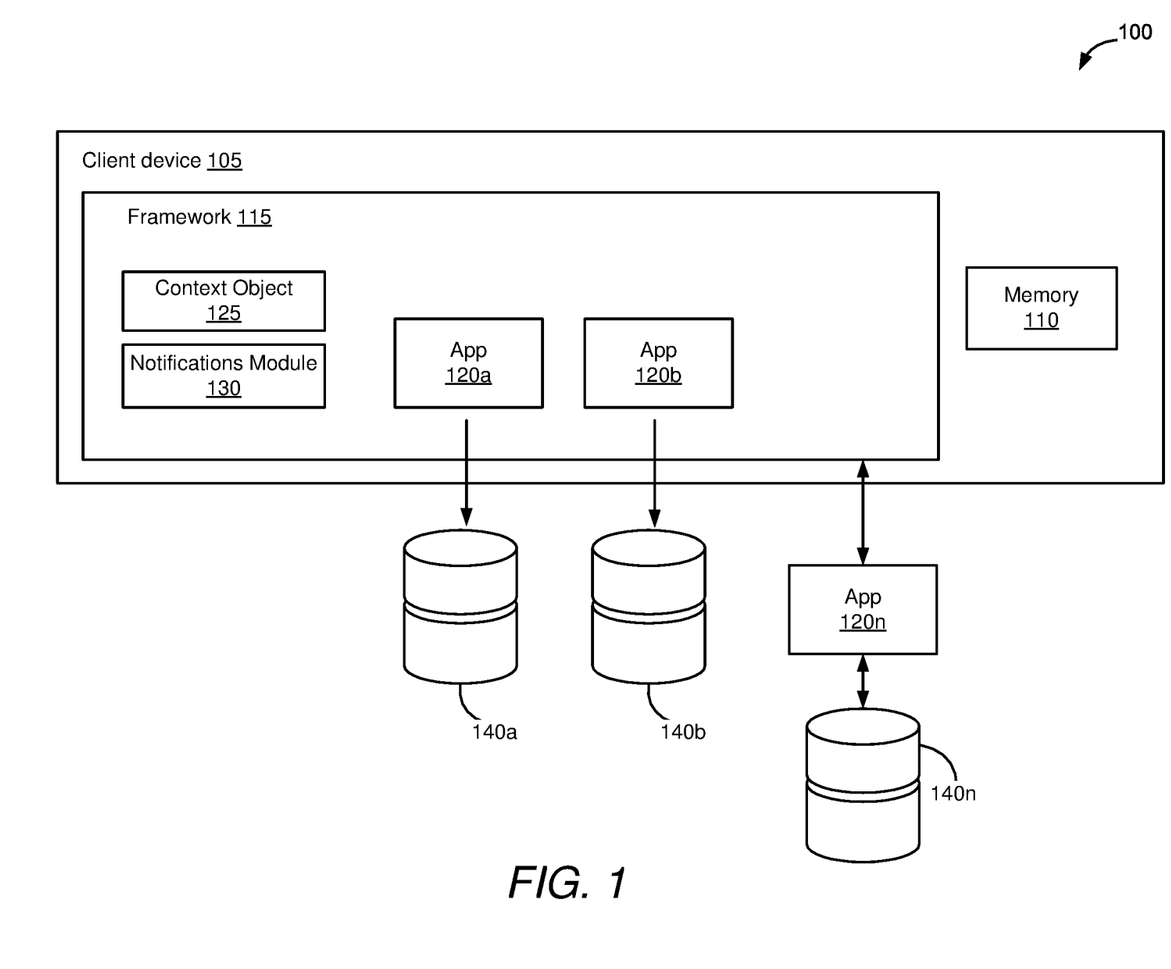
FIG. 1 is a block diagram of one example embodiment of communications within a system for establishing and sharing a common set of data among multiple standalone applications loaded in a framework.

FIG. 1 is a block diagram of one example embodiment of communications within a system 100 for establishing and sharing a common set of data among multiple standalone applications loaded in a framework. System 100 includes a client device 105 having a memory 110 and a framework 115. Framework 115 includes at least two applications 120a and 120b; a context object 125; and a notification module 130. An application 120n operating independently from the framework may be loaded to or connected with framework 115 at a later instance. While applications 120a and 120b may be depicted as executing within framework 115, each of applications 120a and 120b may be standalone and can execute remotely of framework 115. For purposes of discussion, applications 120a, 120b and 120n are collectively referred herein as standalone applications. Each standalone application may have a corresponding data source 140, labeled data source 140a, 140b, and 140n for applications 120a, 120b, and 120n respectively. FIG. 1 shows that each application has a corresponding data source 140; however, it may be apparent in the art that any of standalone applications 120a, 120b, and 120n may not have a corresponding data source.

Client device 105 may be any computing device. In one example embodiment, client device 105 may be, for example, a personal computer or a workstation computer. Client device 105 may include an input device (e.g., a keyboard), a processor, and a memory 110. Memory 110 may be, for example, a random access memory (RAM), a read-only memory (ROM), and/or a non-volatile random access memory (NVRAM). Client device 105 may further include a mass data storage device, such as a hard drive, CD-ROM and/or DVD units. While memory 110 is depicted to be contained in client device 105, in another example embodiment, memory 110 may be caching memory or a session memory of the framework. In yet another aspect, memory 110 may be a storage mechanism remote to client device 105, such as an application server. A location and configuration of memory 110 is immaterial, provided it is communicatively coupled to framework 115. In one aspect, context object 125 is disposed in memory 110.

Client device 105 includes at least one control unit such as, for example, a processor (not shown) that controls its operation(s). In some example aspects, client device 105 may be any computing device that is portable, handheld or pocket-sized such as, for example, a mobile device (e.g., a cellular telephone or a smart phone); a handheld computer; a personal digital assistant (PDA); a notebook computer; a netbook; a tablet computer; or any other remote computing device, such as a special-purpose remote computing device (e.g., an electronic or e-book reader).

Framework 115 is an application in which a plurality of standalone applications 120a, 120b, and 120n is executed. Framework 115 includes one or more program instructions for performing operations detailed below. In one example embodiment, framework 115 may also include functional units or modules launched upon execution of framework 115 on client device 105, such as notifications module 130. In one aspect, at least one of standalone applications 120a, 120b, and 120n may be a module of framework 115.

Figure 2:
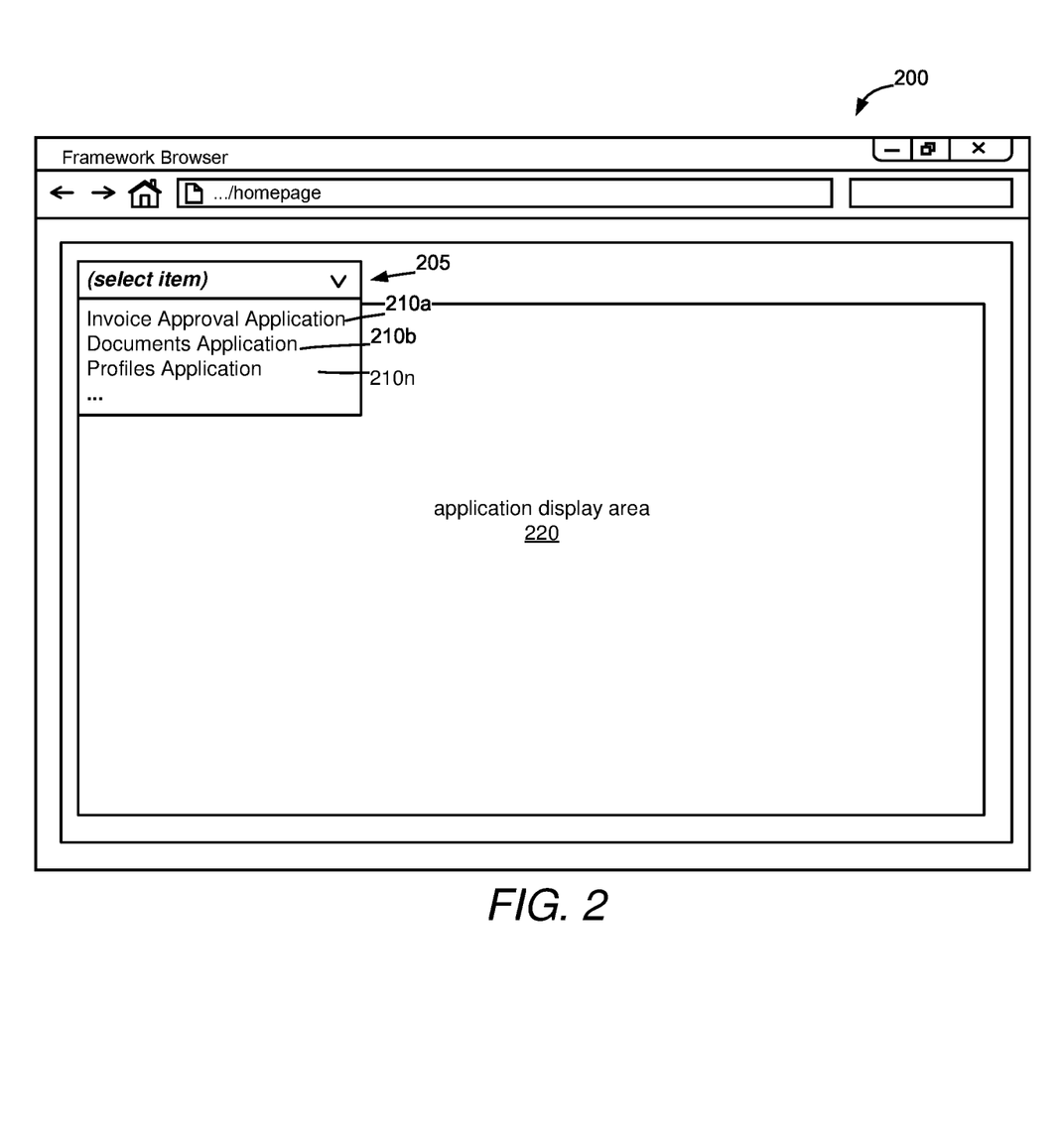
FIG. 2 shows a home page screenshot of the framework based on FIG. 1 and according to an actual embodiment.

Framework 115 includes a module for recognizing or interpreting web content such as a web browser (see FIG. 2). Web content may be a web page, an image, a video, and the like. Accordingly, framework 115 may be able to communicate with a web server for the web content. Framework 115 may further include a module for recognizing or interpreting web code or program script. Said modules may be executed once triggered or identified for execution by one or more program instructions on framework 115.

Framework 115 may be an application local to or for native execution on client device 105. Alternatively, framework 115 may be an application executed via client device 105. Functionalities that are native to client device 105 such as local file system access may be extended to each of standalone applications 120a, 120b, and 120n via framework 115. Framework 115 provides a communication layer common among standalone applications 120a, 120b, and 120n. Framework 115 includes one or more program instructions thereon to send and receive data from any of standalone applications 120a, 120b, and 120n.

Still on FIG. 1, at least one of standalone applications 120a, 120b, and 120n may be an application local or for native execution on client device 105 similar to framework 115. In an alternative example embodiment, at least one of the standalone applications 120a, 120b, and 120n may be an application module created via framework 115 for execution thereon. Framework 115 may be directed to a particular industry and standalone applications 120a, 120b, and 120n may each perform one or more functions specific to that particular industry. For example, framework 115 may be programmed as a higher education system for accessing standalone applications 120a, 120b, and 120n which may be, respectively, an invoice application, a documents application, and a social media profiles application (see FIG. 2). As is apparent in the art, an invoice application, a documents application, and a social media profiles application may be executed solely or incorporated to other industry systems or frameworks 115. Framework 115 may also include standalone generic applications such as, word processing applications, spreadsheet applications, and/or social media applications, such as Facebook® and Twitter®.

With reference back to FIG. 1, corresponding data sources of the standalone applications may contain a plurality of assets which may relate to a function of the application. An application asset may be, for example, a text document, an online form, a web page, a photo, and associated metadata for use in the application. For example, an asset for invoice approval application 120a may be a web-generated invoice.

Respective programming languages of standalone applications 120a, 120b, and 120n may be based on an operating system of client device 105. For example, where the operating system of client device 105 is Microsoft Windows®, application 120a may be written in a language recognizable by Microsoft Windows®. In another example where framework 115 is for execution in a web browser, a standalone application may be written in any programming language particularly recognizable by a web browser, such as, for example, HTML, Javascript, JSON format, or in any other known programming language known for web application development as of the time of filing this application.

In one example embodiment, application 120a may be written in a programming language recognizable by an operating system of client device 105, while application 120b may be written in a programming language recognizable in a web browser environment. As such, framework 115 may include a first component for recognizing and interpreting application programs written for client device 105 (e.g., application 120a) and a second component for recognizing and interpreting web code associated with application 120b. The first component and the second component may be in the form of plug-ins. In this way, any type of application may be deployed or integrated to a code space framework 115 without having to manually integrate and configure application 120 into the framework. Framework 115 may also include other components or plug-ins, such as, for example, a module creator.

Context object 125 may be stored in a portion of memory 110 of client device 105 accessible by framework 115. As discussed above, memory 110 may be remote from client device 105 (i.e., in an application server). In this scenario, context object 125 may be accessible by framework 115 via an application programming interface (API) call. The precise storage location of context object 125 is immaterial, provided that the standalone applications loaded or connected to framework 115 is communicatively coupled to context object 125.

Context object 125 includes a mapping of data attributes defining contextual information concerning an asset from one of standalone applications 120a, 120b, 120n. The data attributes may include a common set of data values based on a user input from one of the standalone applications. Data stored in context object 125 may be updated, as will be detailed below. In some example embodiments, context object 125 may include at least one name-value pair each representing a content attribute and a corresponding data value. For example, a name-value pair may include an identifier for a data field and a value corresponding to the data field identifier (i.e., "Name", and "John Smith" for the data field identifier and data value, respectively). In other example embodiments, context object 125 may include at least one keyword. The at least one keyword may be an identifier associated with a select asset content and may be as broad as identifying general content of a file asset (i.e., a file name) or as specific as to being associated with a particular piece of information indicated on the file asset (i.e., a data field values). The at least one keyword may also include an identifier of the source application. In the case for example where standalone application 120a is an invoice approval application and where assets thereof are in the form of invoices, upon user selection of an invoice number field on a particular invoice, the data field number and the alphanumeric data indicated in the field are sent to framework 115 for storage as context object 125. Each of the standalone applications loaded to or connected with framework 115 includes one or more program instructions for sending the selected data to the framework.

The level of complexity of the data to be stored by one of standalone applications 120a, 120b, and 120n in context object 125 may be preconfigured by a user or administrator of the same application. Conversely the other standalone applications loaded within framework 115 may use the data contained within context object 125 for performing one or more operations which may be predetermined in each application.

As will be recognized in the art, client device 105 may include a user interface display, such as a display monitor for generating a graphical display. Still in FIG. 1, framework 115 may include a notifications module 130. Notifications module 130 may include one or more program instructions for generating displays for data received from each standalone application loaded to the framework 115. In other aspects, notifications module 130 may be programmed to send notifications associated with results of the operations performed to other computing devices communicatively connected to framework 115, such as application or database servers.

FIG. 2 shows a home page screenshot of framework 115 based on FIG. 1 and according to an actual embodiment. In this example embodiment, framework 115 may be an accounting system 200 for execution on client device 105. Accounting system 200 is depicted as a browser which, when executed on client device 105, includes a display with two portions. A first portion or application selector 205 listing links corresponding to the standalone applications in framework 115 for selection, and a second portion or application display area 220 generating content associated with the selected standalone application to be displayed. Application selector 205 indicates a link for executing invoice approval application 210a, a documents application 210b, and a profiles application 120n on application display area 220. Application selector 205 may be depicted as a drop-down combo box. However other types of user interface elements for users to select items may be apparent in the art, such as buttons or checkboxes. In this example embodiment, different standalone applications may be directly accessed on a single interface, without the need to navigate through different browsers or systems. Other types of system or browser layout may be practiced and will be apparent in the art. For example, two or more application displays may be simultaneously generated on a single browser.

Figure 3:
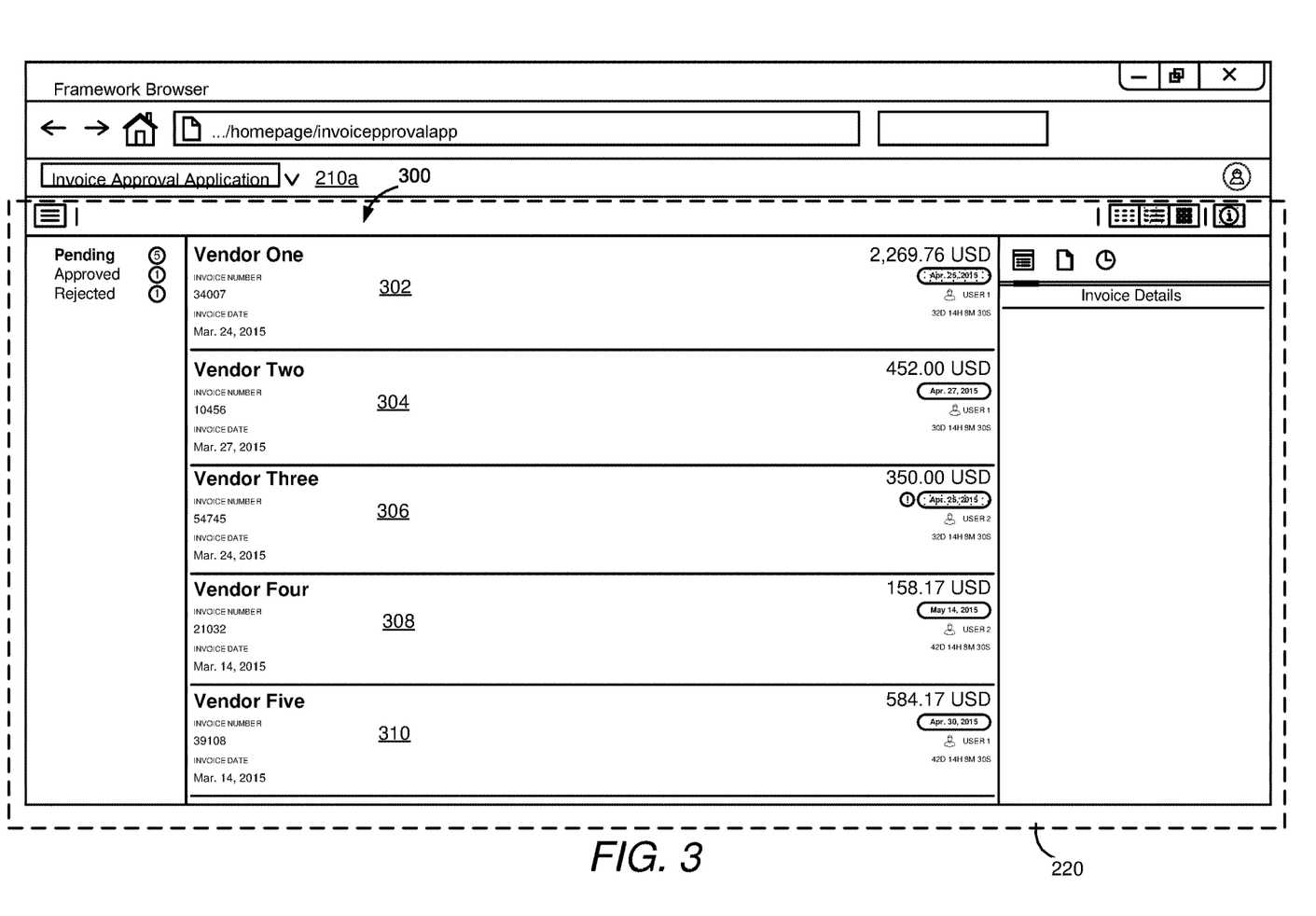
FIG. 3 shows a screenshot view of a selected standalone application in FIG. 2.

FIG. 3 shows a screenshot view of invoice approval application 210a in FIG. 2. Framework 115 embodied by accounting system 200 includes one or more program instructions for generating a display on display area 220 associated with selected standalone application, invoice approval application 210a. In FIG. 3, the display includes a list 300 associated with the selected invoice approval application 210a. List 300 includes a plurality of entries 302, 304, 306, 308, and 310 indicating information relating to particular invoices.

In this example embodiment, entries 302, 304, 306, 308, and 310 may be invoices organized according to an association with a particular user account and/or one or more particular characteristics thereon. For example, a user "John" may have 3 invoices tied up to his account in invoice approval application 210a, such that upon John's selection of the invoice approval application in FIG. 2, the 3 invoices are generated on display area 220. In other example embodiments, invoices may be organized based on their value range or the dates to which they are issued. Still on FIG. 3, entries 302, 304, 306, 308, and 310 all indicate March in its content. Each of entries 302, 304, 306, 308, and 310 may be selectable by a user on the display area via interfacing gestures known in the art.

Figure 4:
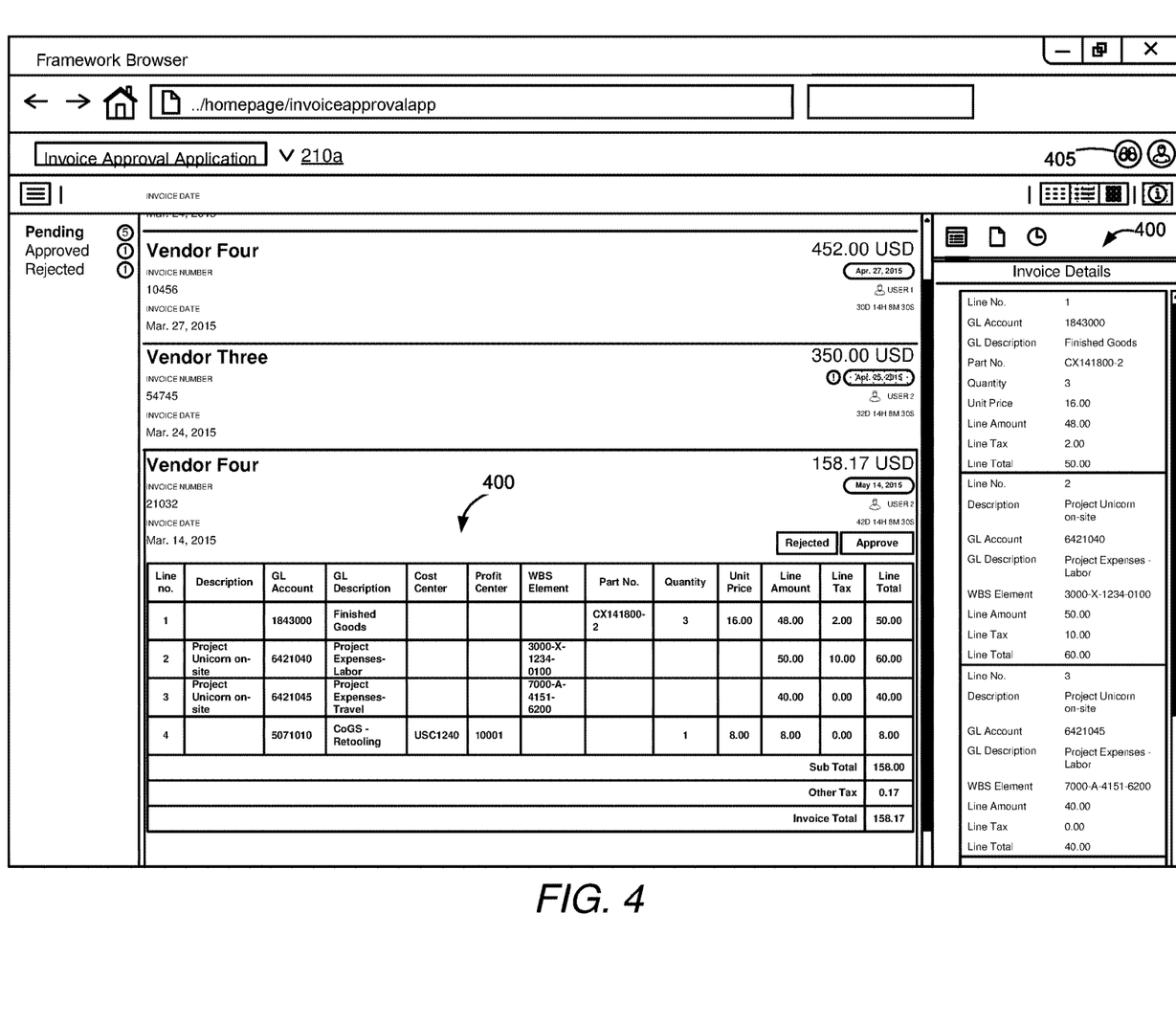
FIGS. 4-5 show screenshot views of example displays when content has been identified to be selected by a user from the selected standalone application in FIG. 3.
Figure 5:
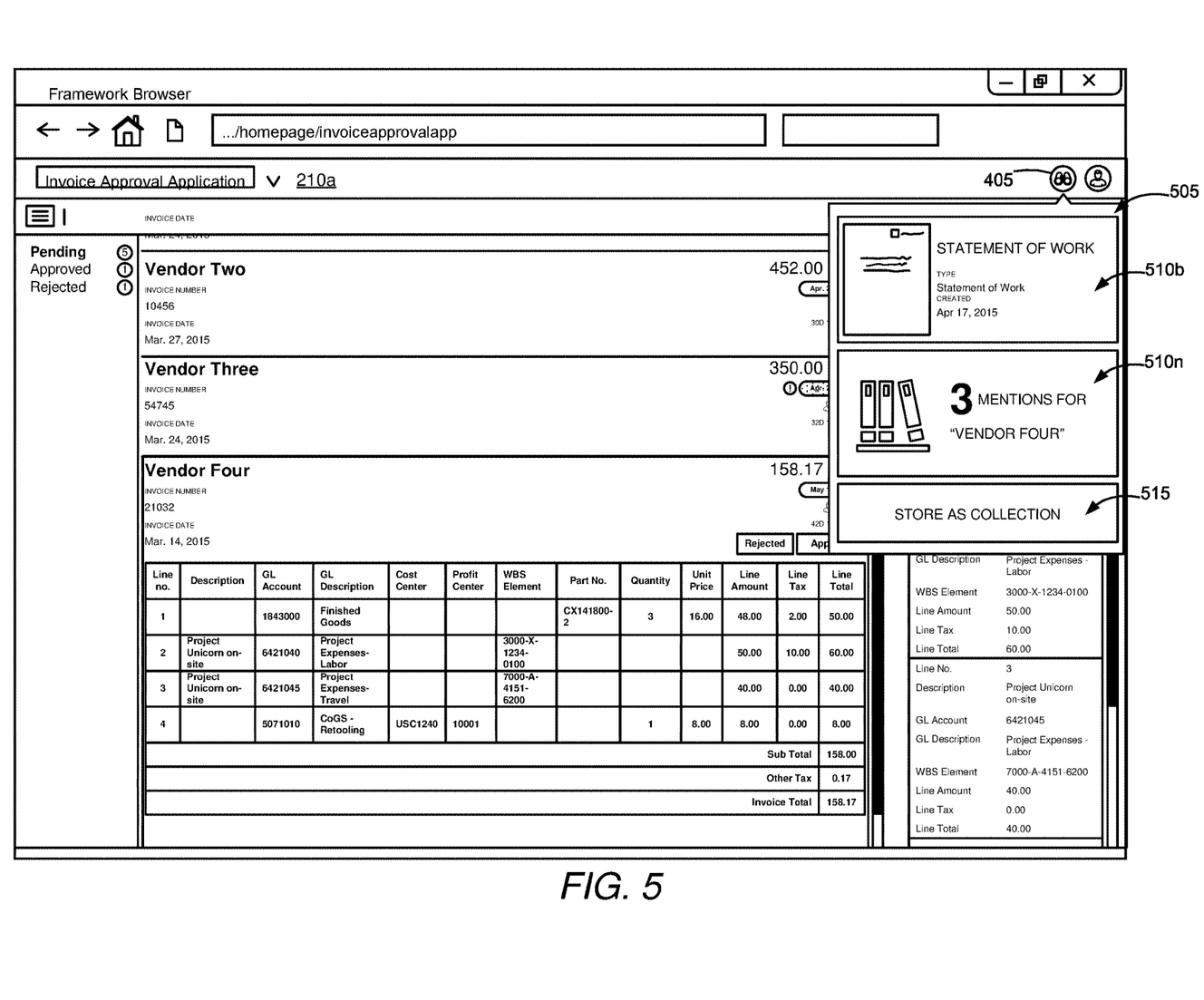

FIGS. 4-5 show example displays on display area 220 when entry 308 "Vendor Four" invoice has been identified by one or more program instructions of accounting system 200 as selected by the user. For purposes of illustration, each of the entries may be programmed to expand in the display area for showing other details associated with the user-selected invoice entries. For example, FIG. 4 shows Vendor Four invoice entry 308, when selected, generating a table 400 for displaying more detailed information regarding the invoice entry. FIG. 4 further includes a search results icon 405 programmed to be generated on system 200 when assets related to the selected entry have been found, as will be discussed in detail below. FIG. 5 shows one example embodiment of a display on system 200 when search results icon 405 has been selected for launching a notifications list 505 indicating assets of other standalone applications having content relating to the selection in FIG. 4. Notifications list 505 includes notifications 510b and 510n each providing a link to an asset of another application and a notification 515 which provides a link to initiating a file retrieval and compilation process in system 100. In the present disclosure, presence of search results icon 405 indicates that the process for retrieving assets related with data in context object 125 has been executed. While FIG. 5 shows the assets from the other applications being presented together with the invoice approval application display on display area 220, notifications on framework 115 may be configured to be displayed in other methods, such as, for example, individual automatic pop-up messages on system 200 upon identification of a related asset.

It may further be noted that selections made by a user on FIGS. 3-5 may be in the form of a tap, a click, or other interfacing gesture known in the art. Additionally one or more program code instructions may be added to each application when integrated onto framework 115 represented by accounting system 200 for communicating with context object 125. For example, when a first standalone application is integrated onto framework 115, program instructions for the first application to send and to receive data from the framework may be automatically added or embedded onto program code thereof. The same is the case when a second application 120 is integrated or loaded into the framework. It may be noted that multiple standalone applications may be simultaneously loaded to framework 115.

Figure 6:
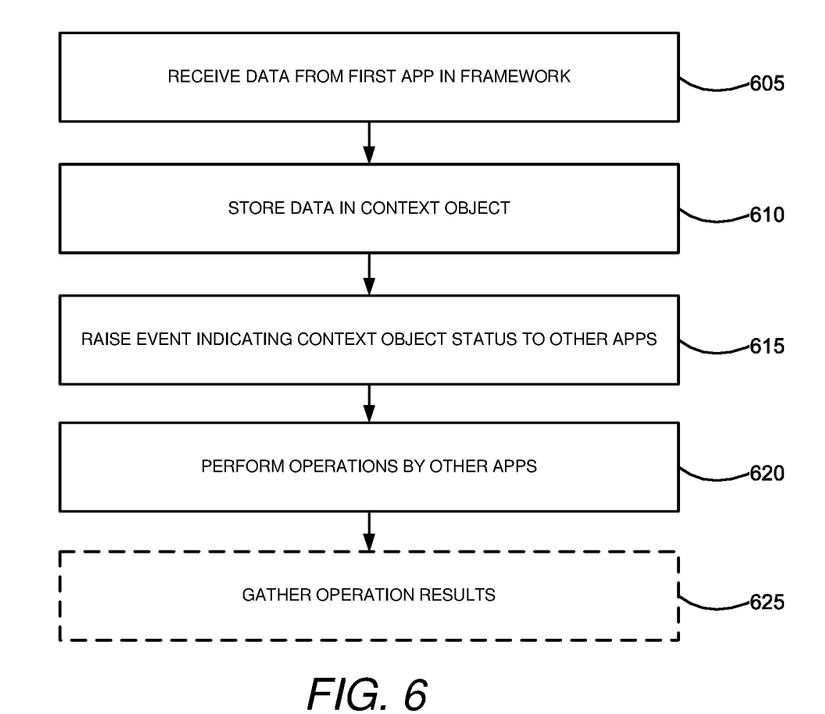
FIG. 6 shows one example flowchart of a method for enabling sharing of data among multiple standalone applications in the framework.

FIG. 6 shows one example flowchart of a method 600 for enabling sharing of data among multiple standalone applications in the framework. Method 600 may be performed by framework 115 on client device 105. Steps 605-625 of FIG. 6 will be discussed in conjunction with the system described in FIG. 1 and as depicted by FIGS. 2-5.

At block 605, framework 115 (represented by accounting system 200 in FIG. 2) may receive data based on a user-selected content from one of the multiple standalone applications loaded thereon. The user-selected content may be associated with an asset actively displayed on accounting system 200. In one aspect, a text input may be made by the user on an application loaded in framework 115. In one example embodiment, one or more program instructions on application may include program instructions to send data associated with a user-selected content to framework 115.

With reference back to FIG. 4, upon receipt of one or more program instructions from invoice approval application 210a indicating that one of the displayed invoice entries has been selected by the user (in this case the Vendor Four invoice entry 308), one or more program instructions on the invoice approval application may notify framework 115 of the selection made. Notifying the framework of a user selection on the application currently generated on display area 220 includes sending data associated with the selection. The data may be in the form of at least one keyword, a set of name-value pairs, and the like, as discussed above. An identifier for the invoice selected ("Vendor Four") is also sent to framework 115. In this example, identifiers of selected invoice entries may be predefined to be sent to the framework by the administrators of the invoice approval application.

Sending data associated with the user selection further includes sending an identifier of the source application to the framework. Using the same example embodiment, one or more program instructions of the invoice approval application may send an identifier thereof (in this case, "invoiceapprovalapp") to framework 115.

At block 610, upon receipt of the set of data from the active standalone applications in the framework, framework 115 may store the set of received data in context object 125. Context object 125 includes: (1) at least one property indicating data attributes describing the context of information to be shared or the received information in block 605, and (2) an identifier of the source application or application setting the context object or the source application identifier. While in the present disclosure, the at least one property and the source application identifier are depicted as two separate elements, both may be stored as a single keyword in context object 125 for use in performing operations, such that, for example, the at least one property includes the source application identifier when being stored in the context object.

In one example embodiment, the at least one property may be predefined content on an application asset, such as predefined data fields. In the same example in FIG. 4, the at least one property and the source application identifier, may be the "Vendor Four" invoice identifier and the "invoiceapprovalapp", respectively, the source application being invoice approval application 210a.

In other example embodiments, a predefined content in an application asset may be changed or updated. For example, values entered on a form field indicating the "Vendor Four" identifier may be changed by an administrator of the invoice approval application a week later. For purposes of discussion, invoice identifier "Vendor Four" may have already been stored in context object 125. In this aspect, invoice approval application may send a notification to framework 115 indicating the update or change in the at least one property of the set context object, which in this case is the "Vendor Four" invoice identifier. The new value may be accordingly sent to the framework for updating the stored context object. Updating the stored context object may include overwriting the data stored therein or appending the new data to the existing data.

Information stored in context object 125 may include at least one keyword and/or a source identifier and may be organized in one or more data structures, such as, for example, a string, an array, a linked list, a hash and/or a combination of other known data structures. For example, first row information on the displayed invoice may be organized in a single data structure and stored as the at least one property for the context object. Each keyword and/or source identifier may be one or more data structures, such as, for example, a string, an array, a linked list, a hash and/or a combination of other known data structures.

At block 615, framework 115 may notify the other applications on the framework besides the source application. The other applications may be identified relative to the identifier of the source application identifier indicated in the context object. Notifying the other applications of the context object may include raising an event indicating that a context object has been set. Raising the event may include sending by the framework the identifier of the source application to the other standalone applications. In an example where an update for any data contained in context object 125 is received from the source application, the event raised may indicate that the context object comprises an update. One or more program instructions on framework 115 may be operative to raise the event to inform the other standalone applications that the context object has been set. Raising the event to other standalone applications within the same framework may include triggering the event on an event aggregator on the framework and broadcasting the event to all the other subscribers which may be functions on other standalone applications, as detailed in U.S. patent application Ser. No. 14/526,173 incorporated herein.

In response to the raised event, each of the other standalone applications may have an option either to get or retrieve at least a portion of the context object, to ignore the context object, or to perform other actions predetermined to be performed by the other application. For example, one or more of the standalone applications in the framework other than the source application may request for the context object in response to the event. Framework 115 may then send the data stored on the context object to the requesting application/s based upon the request.

Using the same example embodiment in FIG. 4, upon setting of the context object ("Vendor Four" keyword and "invoiceapprovalapp" source application identifier) by invoice approval application 210a, one or more program instructions of framework 115 may send an event indicating setting or updated of context object 125 to the other standalone documents application 210b and profiles application 210n. Accordingly, applications 210b and profiles application 210n may opt to request for the context object from framework 115 or not.

At block 620, each of the other standalone applications loaded in framework 115 may perform at least one operation based on the received context object or a portion thereof (presuming, for purposes of discussion, the other standalone applications requested to retrieve the context object). The at least one operation may be predetermined for the application, since applications may vary in function in framework 115. Additionally, operations may be performed automatically upon receipt of the event or the context object or may be performed at a later instance.

An operation may be in the form of search and/or retrieving assets having data matching with at least a portion of the context object or related to the context object. Alternatively, an operation may be the realization of a workflow step or process, which may be, for example, creating a new asset for an application. The at least one operation to be performed on each of the standalone applications may be based on a function or business logic thereof. In one aspect, at least one of the other standalone application may ignore the event raised in block 615. In FIG. 4, documents application 210b and profiles application 210n are programmed to request for the context object and retrieve assets related with the context object from their respective databases based on the received context object. Alternatively, for purposes of discussion, profiles application 210*n* may be programmed to not provide any output or result to framework 115 in response to the event.

In one example embodiment, searching and/or retrieving assets having data matching with at least a portion of the context object may include determining whether one or more assets of an application 120 besides the source application includes the at least one property stored in context object 125, and if so, notifying framework 115 of said one or more assets. Determining whether any asset of another standalone application 120 includes any of those properties stored in context object 125 may include comparing each of those properties with metadata properties of each asset associated with said application.

At optional block 625, framework 115 may receive results of the one or more operations performed on each of the other applications 210*b* and 210*n*. In one aspect, the results may be shown simultaneously with the display generated on area 220. To this end, when a user selection has been determined by framework 115 to have been made by one of applications loaded thereon, assets from the other standalone applications may be retrieved in the background and be shown easily to a user of the invoice approval application via a notifications module (see example list 505 in FIG. 5). In one example embodiment, framework 115 may receive at least one asset identifier from the other standalone applications indicating the at least one property in the context object. With reference back to FIG. 5, notifications 510*b* and 510*n* each provides a link to an asset of applications 120*b* and 120*n*, respectively. Each of the assets indicated include, in their respective metadata values or data fields, the "Vendor Four" identifier stored in context object 125.

In another aspect, an application 120*n* loaded into the framework may be operative to activate a workflow process based on the user selection on another application in the framework. For example, application 120*n* may be operative to collect assets from the other application loaded in the framework and store these related assets as one batch file. As shown, notifications list 505 includes a notification 515 being a link to activating an operation where related assets are collected from applications 210*b*, and 210*n* and stored in the framework as a "collection".

In yet another aspect, notifications module 130 of the framework may be set up differently. In a scenario for example where a new asset is identified to be related to the stored context object, an e-mail message may be preconfigured to be automatically sent to the administrator of the source application indicating the newly identified asset. Other notification methods may be apparent in the art.

In providing framework 115 which includes context object 120 communicatively coupled to each standalone application (120*a*, 120*b*, and 120*n*), each of the standalone application may be able to: (1) send and update a common set of data for accessing and transmitting to other applications via the framework and (2) share that common set of data to another without one knowing specific configurations, much less storage parameters, about the other. Further, in loading any of standalone applications 120*a*, 120*b*, and 120*n* to framework 115, each of the standalone applications is able to identify or search related assets from other standalone application without programmatically tying the applications.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method executed by a computing device for sharing data among a plurality of standalone applications executing on the computing device, comprising:
  receiving, by a framework executing on the computing device, a keyword based upon a user input to a first standalone application in the plurality of standalone applications, the first standalone application is loaded via the framework, wherein the keyword is associated with an asset of the first standalone application, wherein the asset is stored in a first data source associated with the first standalone application; and
  storing, by the framework, the keyword in a context object, wherein the context object comprises:
    a mapping between the keyword and the asset stored in the first data source; and
    an identifier for the first standalone application,
  wherein the context object is accessible by each of the plurality of standalone applications in the framework; and
  performing, by a second standalone application in the plurality of standalone applications loaded via the framework, an operation based upon the context object, wherein a second data source is associated with the second standalone application.

2. The method of claim 1, further comprising connecting the second standalone application to the framework based upon a request thereby to access the context object.

3. The method of claim 1, further comprising broadcasting, by the framework, an event to the second standalone application, the event indicative of a status of the context object.

4. The method of claim 1, wherein performing the operation based upon the context object comprises executing a search for a second asset having content related to the keyword, the second asset is stored in the second data source, the method further comprising:
  broadcasting, by the framework, an event to the second standalone application, the event indicative of a status of the context object;
  retrieving, by the second standalone application, the keyword in the context object;
  receiving a result of the one or more operation on the framework, the result including the second asset; and
  notifying a user of the second standalone application of the result.

5. The method of claim 1, further comprising receiving an updated keyword from the first standalone application or the second standalone application and updating, by the framework, the keyword in the context object.

6. The method of claim 1, wherein the keyword is a complex data structure.

7. The method of claim 1, wherein the identifier for the first standalone application indicates that the first standalone application is a source of the keyword.

8. The method of claim 1, wherein the first standalone application is a higher educational admissions application, wherein the second standalone application is a social media application.

9. The method of claim 1, further comprising providing, by the framework, the context object to the second standalone application.

10. A non-transitory computer-readable storage medium storing instructions that, when executed by a computing device, cause the computing device to perform acts comprising:
receiving, by a framework executing on a computing device, a keyword based upon a user input to a first standalone application in a plurality of standalone applications executing on the computing device, the first standalone application is loaded via the framework, wherein the keyword is associated with an asset of the first standalone application, wherein the asset is stored in a first data source associated with the first standalone application; and
storing, by the framework, the keyword in a context object, wherein the context object comprises:
a mapping between the keyword and the asset stored in the first data source; and
an identifier for the first standalone application, wherein the context object is accessible by each of the plurality of standalone applications in the framework; and
performing, by a second standalone application in the plurality of standalone applications loaded via the framework, an operation based upon the context object, wherein a second data source is associated with the second standalone application.

11. The non-transitory computer-readable storage medium of claim 10, wherein each of the plurality of standalone applications is one of a module of the framework or an independent application connected to the framework.

12. The non-transitory computer-readable storage medium of claim 10, wherein the first standalone application is preconfigured by an administrator of the framework to be a source of the context object.

13. The non-transitory computer-readable storage medium of claim 10, the acts further comprising broadcasting, by the framework, an event to the second standalone application, the event indicative of a status of the context object.

14. The non-transitory computer-readable storage medium of claim 13, wherein the status of the context object is at least one of an initialization status or an update status.

15. The non-transitory computer-readable storage medium of claim 10, wherein the context object is maintained in a memory associated with the framework, the memory being one of a memory on the computing device or a browser memory.

16. The non-transitory computer-readable storage medium of claim 10, wherein each of the plurality of standalone applications is accessible via a browser interface of the framework.

17. A method executed by a computing device for gathering related content from a plurality of standalone applications executing on the computing device based on a shared set of data, comprising:
receiving, by a framework executing on the computing device, a keyword based upon a user input to a first standalone application in the plurality of standalone applications, the first standalone application is loaded via the framework, wherein the keyword is associated with an asset of the first standalone application, wherein the asset is stored in a first data source associated with the first standalone application;
storing, by the framework, the keyword in a context object, wherein the context object comprises:
a mapping between the keyword and the asset stored in the first data source; and
an identifier for the first standalone application;
broadcasting, by the framework, an event to a second standalone application in the plurality of standalone applications, the event indicative of a status of the context object, wherein a second data source is associated with the second standalone application; and
receiving, by the framework, a result of an operation performed by the second standalone application, the result including a second asset associated with the second standalone application and related to the keyword.

18. The method of claim 17, further comprising notifying, by the framework, a user of the one of the first standalone application or the second standalone application of the received result.

19. The method of claim 17, wherein the receiving the keyword is based on a user selection on the first standalone application while the first standalone application is being displayed on the computing device via the framework, and the receiving the result includes displaying the result simultaneously with a display of the second standalone application on the computing device, wherein the keyword is a complex data structure.

20. The method of claim 17, wherein the receiving the result includes receiving a link to the second asset as stored in the second data source.

\* \* \* \* \*